(12) United States Patent
Singleton et al.

(10) Patent No.: US 10,472,066 B2
(45) Date of Patent: Nov. 12, 2019

(54) CHILLER GALLEY CART, GALLEY, AND METHOD FOR COOLING

(71) Applicant: THE BOEING COMPANY, Chicago, IL (US)

(72) Inventors: Christopher Singleton, Lake Stevens, WA (US); Joshua Yu-Hu Lee, Seattle, WA (US)

(73) Assignee: The Boeing Company, Chicago, IL (US)

( * ) Notice: Subject to any disclaimer, the term of this patent is extended or adjusted under 35 U.S.C. 154(b) by 372 days.

(21) Appl. No.: 15/354,099

(22) Filed: Nov. 17, 2016

(65) Prior Publication Data
US 2018/0134389 A1    May 17, 2018

(51) Int. Cl.
*B64D 11/00* (2006.01)
*F25D 17/04* (2006.01)
(Continued)

(52) U.S. Cl.
CPC .......... *B64D 11/0007* (2013.01); *B64D 11/04* (2013.01); *B64D 13/06* (2013.01); *F25D 17/045* (2013.01); *A47B 2031/023* (2013.01); *B62B 2202/67* (2013.01); *B62B 2204/04* (2013.01); *B64D 2013/0629* (2013.01); *F25D 2317/067* (2013.01); *F25D 2400/40* (2013.01)

(58) Field of Classification Search
CPC ............ B62B 2204/04; B62B 2202/67; B64D 2013/0629
See application file for complete search history.

(56) References Cited

U.S. PATENT DOCUMENTS 4,361,014 A * 11/1982 Blain .................... A47J 39/006
62/237
9,062,909 B2    6/2015 Lu et al.
(Continued)

FOREIGN PATENT DOCUMENTS

DE    102007054291 A1    4/2009
EP       2937284 A1    10/2015
(Continued)

OTHER PUBLICATIONS

Machine Translation of FR2820196 retrieved on Jan. 2019 (Year: 2019).*
(Continued)

*Primary Examiner* — Orlando E Aviles
(74) *Attorney, Agent, or Firm* — Jay J. Hoette; The Small Patent Law Group, LLC

(57) ABSTRACT

A chiller galley cart includes a plurality of walls defining an interior cavity, a supply valve defined in one wall of the plurality of walls, and a return valve defined in one wall of the plurality of walls. The supply valve and the return valve are configured to couple to a chiller positioned in the interior cavity to provide cooled airflow from the chiller galley cart. A method for cooling a demand galley cart positioned in a cart compartment of a galley includes positioning a chiller galley cart in the cart compartment having a chiller positioned in the interior cavity coupled to the supply valve and the return valve and coupling the supply valve to a supply port of the galley and coupling the return valve to a return port of the galley.

21 Claims, 6 Drawing Sheets

(51) Int. Cl.
  *B64D 11/04* (2006.01)
  *B64D 13/06* (2006.01)
  *A47B 31/02* (2006.01)

(56) References Cited

U.S. PATENT DOCUMENTS

| | | | |
|---|---|---|---|
| 2005/0210910 A1* | 9/2005 | Rigney | B60H 1/00014 62/407 |
| 2009/0145150 A1* | 6/2009 | Konrad | F25D 15/00 62/255 |
| 2013/0047657 A1 | 2/2013 | Oswald et al. | |
| 2015/0007600 A1* | 1/2015 | Godecker | B64D 11/04 62/238.6 |
| 2015/0059363 A1 | 3/2015 | Burd et al. | |

FOREIGN PATENT DOCUMENTS

| | | |
|---|---|---|
| FR | 2820196 A1 | 8/2002 |
| GB | 2095387 A | 9/1982 |

OTHER PUBLICATIONS

Extended European Search Report for corresponding EP Application No. 17185624.8-1754 dated Dec. 11, 2017 (9 pages).
Air management Air Cooling Unit, Apparatebau Gauting GmbH: Air Cooling Unit, www.aoa-gauting.de/de/en/systems/air-management/air-cooling-unit.html.

\* cited by examiner

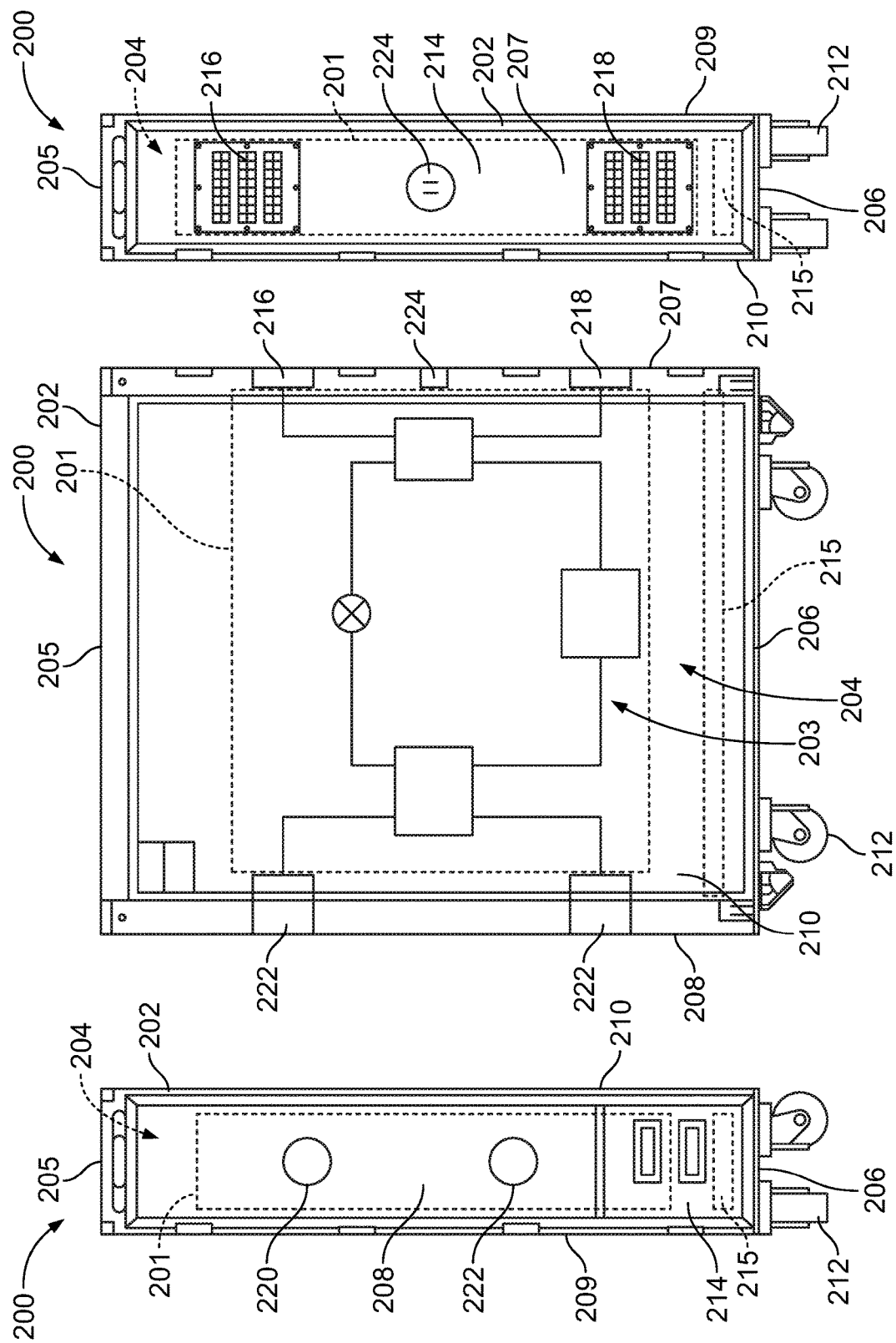

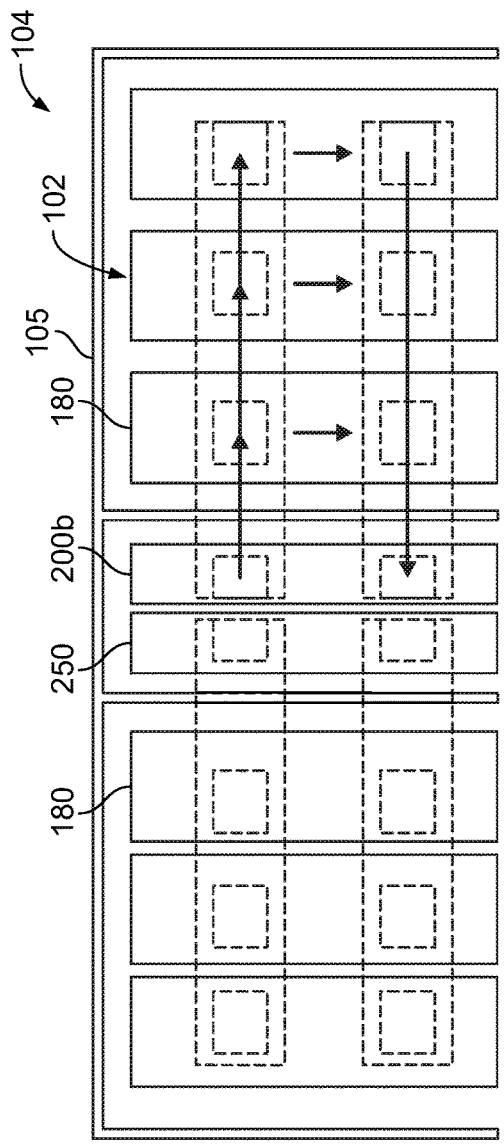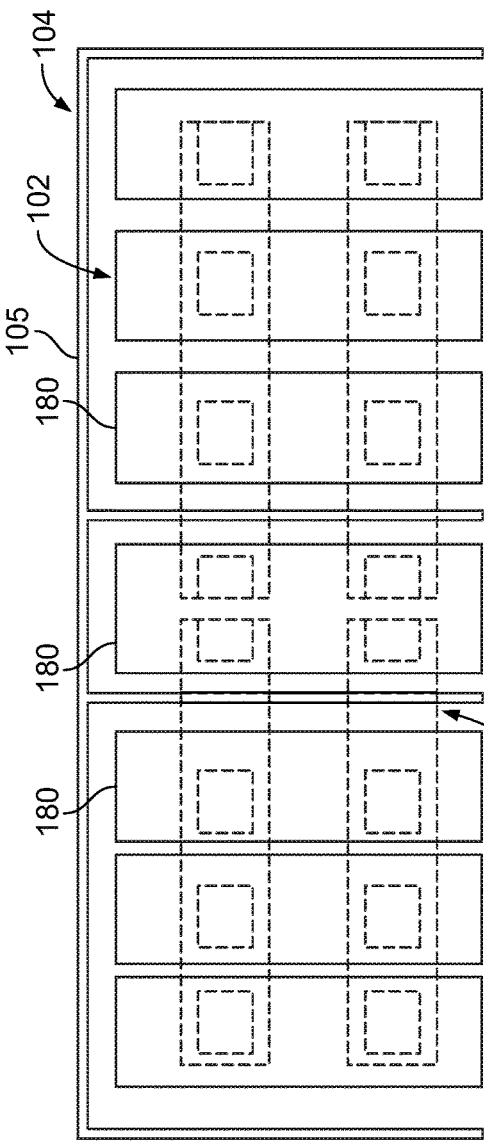

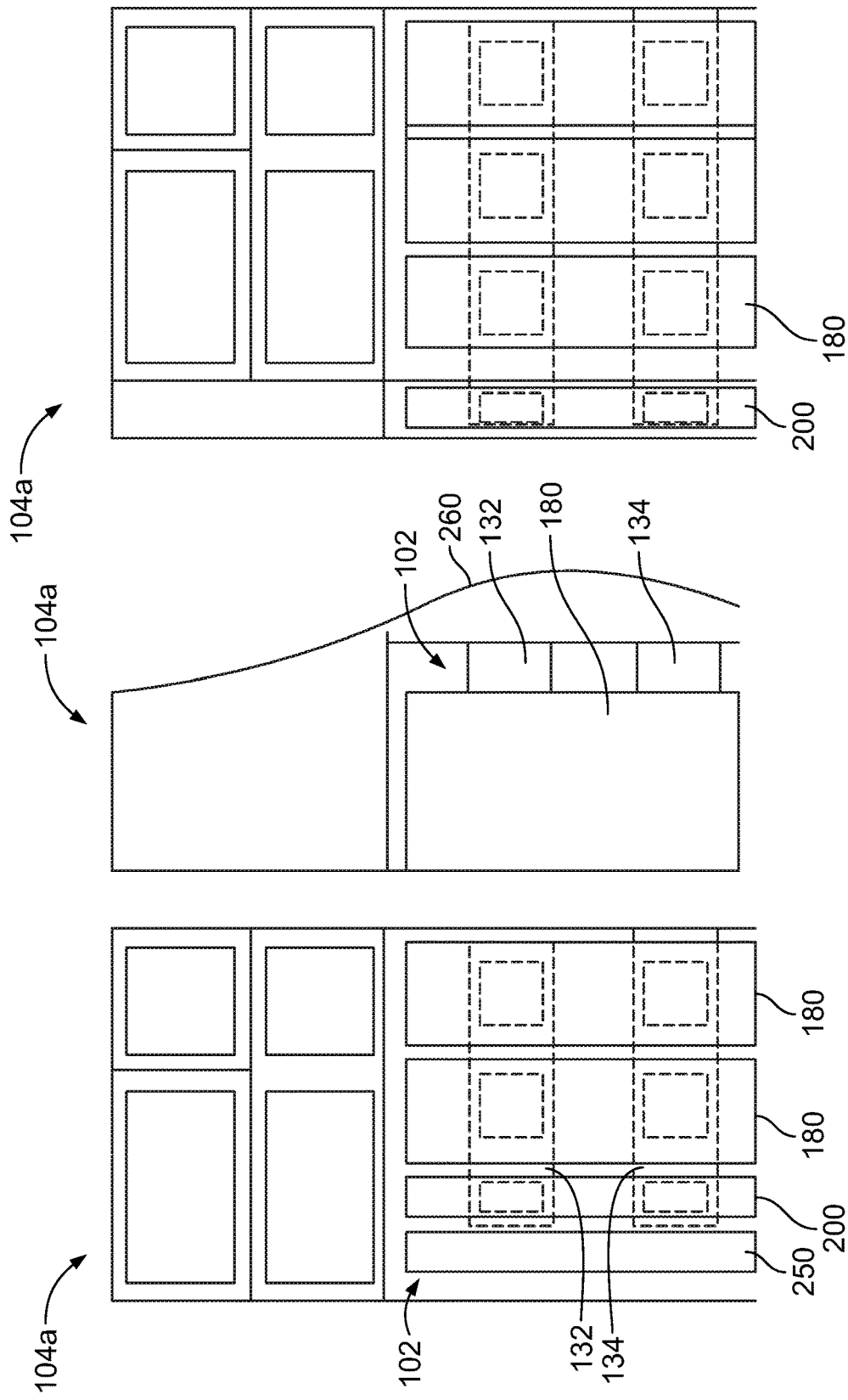

CHILLER GALLEY CART, GALLEY, AND METHOD FOR COOLING

BACKGROUND

The present disclosure relates generally to systems and methods of cooling a galley of an aircraft.

Aircraft typically include multiple galleys to store food and beverages on the aircraft. The food and beverages are typically stored in galley carts, which are transported to the aircraft and stored in refrigerated compartments or zones in the galleys. A heat exchanger is typically provided at the top of the galley and supplies cooled air to each of the compartments or zones via a plurality of air ducts and other components. In conventional systems, the air ducts and the supply and return devices associated with the air ducts are routed through the rear wall of the galley to the cart compartment to supply the cooled air to the cart compartment and to return the air to the heat exchanger. For example, vertical ducts may extend from the heat exchanger, located above the galley, down the rear wall of the galley to the level of cart compartment, which is located at the bottom of the galley. Horizontal ducts may extend from the corresponding vertical ducts along the various galley carts to supply the air to, or return the air from, the galley carts and the cart compartment.

Conventional galley systems are not without disadvantages. For instance, a large amount of space is required for the heat exchanger components and the airflow supply and return components. Additionally, the heat exchanger components add weight to the galley, and thus the aircraft. Additionally, zone control of the cooling system is difficult, making it difficult to control the amount of cooling supplied to the cart compartment holding the galley carts. For example, on some flights, cooling of some or all of the galley carts may not be necessary; however, to cool any of the galley carts, the system provides cooling to all of the galley carts.

SUMMARY

In accordance with one embodiment, a chiller galley cart includes a plurality of walls defining an interior cavity, a supply valve defined in one wall of the plurality of walls, and a return valve defined in one wall of the plurality of walls. The supply valve and the return valve are configured to couple to a chiller positioned in the interior cavity to provide cooled airflow from the chiller galley cart.

In accordance with one embodiment, a galley includes a cart compartment configured to store a plurality of galley carts, a supply duct configured to be in flow communication with the plurality of galley carts, and a return duct configured to be in flow communication with the plurality of galley carts. The galley includes a chiller supply port in flow communication with the supply duct and a chiller return port in flow communication with the return duct. The chiller supply port is configured to couple to a supply valve of a chiller galley cart of the plurality of galley carts to channel cooled air from a chiller positioned in the chiller galley cart into the supply duct. The chiller return port is configured to couple to a return valve of the chiller galley cart to channel return air from the return duct into the chiller positioned in the chiller galley cart.

In accordance with one embodiment, a method for cooling at least one demand galley cart positioned in a cart compartment of a galley including a supply duct, a return duct, a supply port in flow communication with the supply duct, and a return port in flow communication with the return duct includes positioning a chiller galley cart in the cart compartment. The chiller galley cart includes a plurality of walls defining an interior cavity, a supply valve defined in one wall of the plurality of walls, a return valve defined in one wall of the plurality of walls, and a chiller positioned in the interior cavity coupled to the supply valve and the return valve. The method also includes coupling the supply valve of the chiller galley cart to the supply port to provide cooled air from the chiller to the supply duct and coupling the return valve of the chiller galley cart to the return port to provide return air from the return duct to the chiller.

The features and functions that have been discussed can be achieved independently in various embodiments or may be combined in yet other embodiments, further details of which can be seen with reference to the following description and drawings.

BRIEF DESCRIPTION OF THE DRAWINGS

FIG. 3 is a front view of a chiller galley cart in accordance with an exemplary embodiment.

FIG. 4 is a side view of the chiller galley cart.

FIG. 5 is a rear view of the chiller galley cart.

FIG. 10 is a schematic illustration of a portion of the galley showing the cart compartment.

FIG. 11 is a schematic illustration of a portion of the galley showing the cart compartment.

FIG. 12 is a schematic illustration of a portion of the galley in accordance with an exemplary embodiment.

FIG. 13 is an end view of the galley shown in FIG. 12 showing the cart compartment.

FIG. 14 is a schematic illustration of a portion of the galley in accordance with an exemplary embodiment.

DETAILED DESCRIPTION

Figure 1:
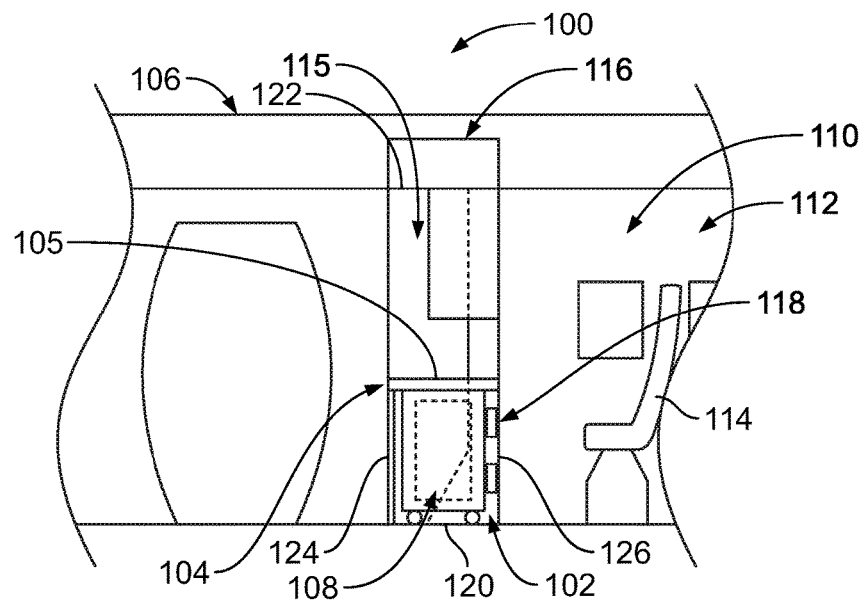
FIG. 1 is a schematic illustration of an exemplary galley system for an aircraft.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a galley system for an aircraft configured to supply cooling air to a cart compartment of a galley monument, or simply galley, for cooling galley carts. Various embodiments provide the cooling airflow from a point-of-use chiller arranged in a galley cart, which may reduce the space dedicated in the galley for the heat exchange system, thus providing more space in the galley for stowage and/or the passenger compartment for passenger seats or passenger legroom. Various embodiments provide an efficient cooling environment for the galley carts using a chiller in a galley cart. The chiller galley cart may be used on some flights when cooling is needed and may be removed for other flights that do not need cooling of the galley carts. The chiller galleys cart thus provides flexibility in the cooling arrangement. The chiller galley cart may be used in various types of galleys, such as convertible galleys and provide cooling for such convertible galleys. The chiller galley carts may be used in galleys having traditional heat exchange systems, such as for boosting the cooling capacity of the heat exchange system in the cart compartment.

FIG. 1 is a schematic illustration of an exemplary galley system 100 for an aircraft 106. The galley system 100 is used to cool galley carts 108 held in cart compartments 102 of a galley 104. The galley 104 defines one or more cart compartments 102, which are typically arranged below a mid-wall 105 of the galley 104, which may define a counter and be referred to hereinafter as counter 105. The mid-wall 105 defines a top of the cart compartment 102.

The galley 104 is positioned within a cabin 110 of the aircraft 106, and the cabin of the aircraft 106 is divided into a passenger area 112, where passenger seats 114 are located, and a galley area 115, where the galley 104 is located. The passenger area 112 is the area exterior of the galley 104 within the aircraft 106 where passengers are typically located. The galley area 115 has a working area for the galley crew forward of the galley 104 where the cart compartments 102, counter 105 and cabinets or storage bins may be accessed. Space dedicated to the galley 104 is unusable for passenger seats 114 or other purposes such as lavatories, and thus it may be desirable for aircraft manufacturers to reduce the footprint of the galley area 115 in order to increase the passenger area 112 to increase revenue of each flight for aircraft operators.

Figure 2:
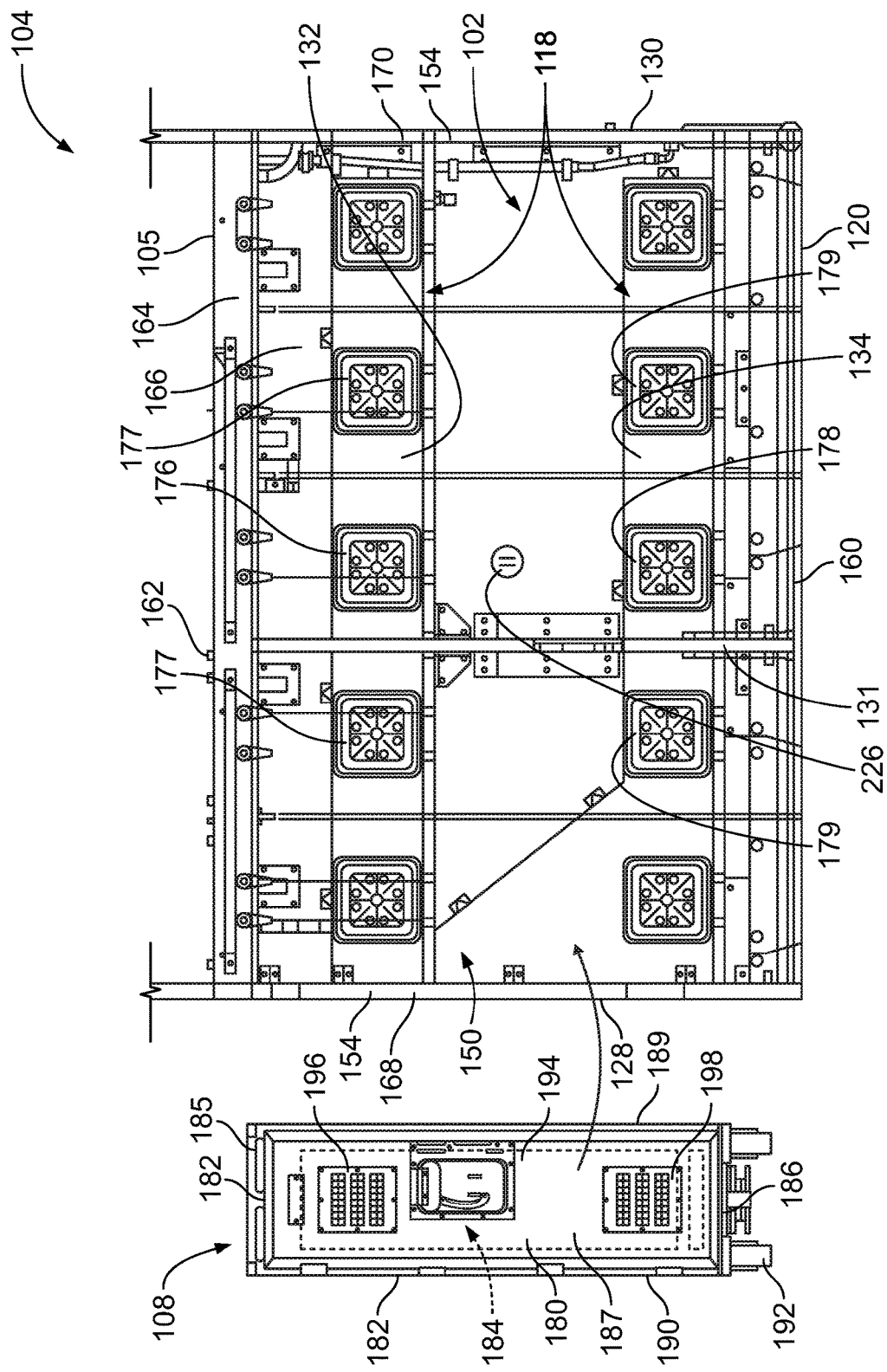
FIG. 2 is a front view of a portion of the galley showing a galley cart adjacent the galley configured to be received in a cart compartment of the galley.

The galley 104 includes a bottom 120, a top 122, a front 124, a rear 126 opposite the front 124, and first and second sides 128, 130 (shown in FIG. 2). The mid-wall 105 extends at least partially between the sides 128, 130 and at least partially between the front 124 and the rear 126. The mid-wall 105 may be approximately centered between the bottom 120 and the top 122; however, the mid-wall 105 may be positioned closer to the bottom 120 or closer to the top 122 in various embodiments. In the illustrated embodiment, the cart compartment 102 is positioned between the mid-wall 105 and the bottom 120. The rear 126 may be fore facing, aft facing or side facing, depending on the orientation of the galley 104 within the cabin 110. The rear 126 may face the passenger area 112 (e.g., passenger seats 114 may be located behind the rear 126, in front of the rear 126, and the like); however, in alternative embodiments, the rear 126 may be positioned against a bulkhead.

The galley may be a fore-galley, an aft-galley, a mid-galley or another type of galley, such as a convertible galley, which may be convertible between a galley and another use, such as a closet. Cooling may be provided in the convertible galley on flights needing additional galley cart cooling. The convertible galley may not include a dedicated heat exchanger, but rather receive a point-of-use chiller in the cart compartment defined in the convertible galley. In various embodiments, the galley 104 may include a dedicated heat exchanger, such as an overhead heat exchanger in the crown of the aircraft used to supply cooling airflow to the cart compartment 102 for cooling the galley carts 108. However, in other alternative embodiments, the galley 104 may be designed to provide cooling without having an overhead heat exchanger. For example, the galley 104 may receive one or more chiller galley carts having point-of-use chillers in the chiller galley carts that provide cooling for other, demand galley carts that need cooling.

As used herein a cart compartment is an insulated or uninsulated volume that is utilized to store one or more galley carts on the aircraft 106. A galley cart, as used herein, is a portable device that is configured to be received in the cart compartment. A demand galley cart is a type of galley cart having a demand for cooling, such as a galley cart used to store food and/or beverages that are transported from a caterer to the aircraft 106 or from the cart compartments 102 to other parts of the aircraft 106 for serving the food and/or beverages. A chiller galley cart is a type of galley cart having a point-of-use chiller in the interior of the galley cart. The galley carts may include wheels, however some galley carts may be hand carried boxes in some embodiments.

The galley 104 may include any number of cart compartments 102 and the aircraft 106 may include any number of galleys 104. The galleys 104 are typically arranged near the doors of the aircraft 106, such as at the fore and/or aft of the cabin 110, but may be located mid-cabin in some embodiments. Each cart compartment 102 may hold any number of galley carts 108. The galleys 104 may be used for the storage and/or preparation of food or beverages. Some galleys may be bar units used strictly for preparation of beverages. Some galleys may be incorporated into other monuments used for other purposes such as closets, workstations, lavatories, and the like.

In an exemplary embodiment, the galley system 100 includes a heat exchanger 116 that provides cooled air, such as to the galley carts 108 in the cart compartment 102. The heat exchanger 116 may be mounted in the galley 104, such as positioned at the top of the galley 104 (e.g., in the crown of the aircraft 106), may be positioned in the galley 104 (e.g., above the counter), or may be positioned below the galley 104 (e.g., in the belly of the aircraft 106). In other various embodiments, the galley system 100 may be devoid of an in-galley mounted heat exchanger 116. In such embodiments, cooling for the galley carts 108 may be provided by one or more point-of-use chiller galley carts, as described in further detail below. In an exemplary embodiment, the galley system 100 includes an airflow supply and return system 118, in flow communication with the cart compartment(s) 102 to channel chilled air supply to the demand galley carts 108, such as from the heat exchanger 116 and/or from the chiller galley cart(s) 108.

In an exemplary embodiment, the heat exchanger 116 includes a fan or other air-handling device to increase the flow of air through the galley system 100. The fan forces the airflow through the airflow supply and return system 118 and directs the air over a galley-chilling unit used to reduce the temperature of the airflow. The fan may be positioned in the airflow supply and return system 118, such as between a return duct and a supply duct. The fan may be positioned upstream of the galley chilling unit; however, the fan may be positioned at other locations in alternative embodiments. In one embodiment, the galley chilling unit is a liquid-cooled galley chilling unit that provides chilled liquid, such as a refrigerant, to the heat exchanger 116 to cool the air supply. In another embodiment, the galley chilling unit is a conventional refrigeration unit, which includes an evaporator, a condenser, a compressor, and an expansion valve (not shown).

The airflow supply and return system 118 is arranged within the galley 104. Components of the airflow supply and return system 118 may be routed in various locations of the galley 104 and/or aircraft to supply and return the air as needed. In the illustrated embodiment, components of the airflow supply and return system 118 are generally arranged along the rear 126 of the galley 104, such as along the rear of the galley 104 (e.g., at the rear of the cabinets, at the rear of the cart compartment(s) 102, at the rear of other compartments of the galley 104, and the like). In embodiments that do not include the heat exchanger, such as embodiments that provide cooling for the cart compartment 102 using the chiller galley carts, the airflow supply and return system 118 may be entirely contained within the cart compartment 102, such as along or in the wall at the rear 126. In an exemplary embodiment, the components of the airflow supply and return system 118 are routed in areas to reduce a depth of at least a portion of the galley 104. For example, the ducts of the airflow supply and return system 118 may be eliminated above the mid-wall 105, which may decrease the size of the galley 104 and/or increase the size of the cabinets for stowing other items.

The airflow supply and return system 118 includes a plurality of ducts to supply cooled air and return warmed air for cooling the galley carts 108. For example, the system 118 includes at least one cooling air supply duct 132 to supply cooled air to the cart compartment(s) 102 and/or the demand galley carts and at least one air return duct 134 to return air to the heat exchanger 116 and/or the chiller galley cart. The ducts 132, 134 may be routed to directly interface with the galley carts 108, such as through an air-through cooling arrangement, or may be routed to appropriate locations in the cart compartment 102 for an air-over cooling arrangement.

FIG. 2 is a front view of a portion of the galley 104 below the mid-wall 105 and showing one of the galley carts 108 adjacent the galley 104 and configured to be received in the cart compartment 102 of the galley 104. FIG. 2 shows the first and second sides 128, 130 of the galley 104 with the cart compartment 102 between the first and second sides 128, 130. A partition wall 131 may be provided between portions of the cart compartment 102 or may divide the space into multiple cart compartments 102.

The cart compartment 102 is positioned near the bottom 120, such as below the mid-wall 105, for loading and unloading of the galley carts 108 into a cavity 150 defined by the cart compartment 102. Cabinets or other non-cooled compartments may be provided above the cart compartment 102, such as above the counter area of the galley 104. In some alternative embodiments, cooled compartments may be provided above the counter area and the airflow supply and return arrangements may be used to cool such cabinets.

Optionally, the cart compartment 102 may have one or more doors at the front 124 that may be opened to provide access to the cavity 150 of the cart compartment 102, such as to load and unload the galley carts 108 through the front 124. The door(s) may be closed to retain the galley carts 108 in the cart compartment 102 and/or to enclose the cooling space in the cavity 150 and/or to provide thermal insulation. In an exemplary embodiment, when the galley cart 108 is positioned in the cavity 150, a space is defined about the galley cart 108. Optionally, air may be able to flow around the galley cart 108 in the space. In alternative embodiments, an air-through-cart supply arrangement may be utilized and, in such embodiment, the doors may be unnecessary. Locks may be used to hold the galley carts 108 in the cart compartment 102 rather than needing doors.

The galley 104 includes a plurality of walls 154 defining the cavity 150 of the cart compartment 102. In an exemplary embodiment, the cart compartment 102 includes a bottom wall 160, a top wall 162, a front wall 164, a rear wall 166 and side walls 168, 170. Optionally, the galley 104 may include multiple cart compartments 102 (e.g., a left side and a right side cart compartment) and the side walls 168, 170 may separate adjacent cart compartments 102. In alternative embodiments, the galley 104 may include a single cart compartment 102 and the side walls 168, 170 define or extend along the exterior sides 128, 130 of the galley 104. The front wall 164 includes one or more doorways defined therethrough that allow the galley cart 108 to be loaded into, and unloaded from, the cart compartment 102. The top wall 162 may be defined by the mid-wall 105 of the galley 104, or alternatively, the mid-wall 105 may be positioned above the top wall 162. The bottom wall 160 may be defined by a floor of the cabin 110, or alternatively, the bottom wall may be positioned on the floor of the cabin 110.

In an exemplary embodiment, the airflow supply and return system 118 includes at least one supply device provided along and in flow communication with the supply duct 132 and at least one return device provided along and in flow communication with the return duct 134. For example, in the illustrated embodiment, the airflow supply and return system 118 includes a chiller supply port 176, a plurality of demand supply ports 177, a chiller return port 178, and a plurality of demand return ports 179. The chiller supply port 176 and demand supply ports 177 are in flow communication with the supply duct 132 and the chiller return port 178, and demand return ports 179 are in flow communication with the return duct 134. In various embodiments, the airflow devices may be air grilles with openings allowing airflow therethrough. In other embodiments, the airflow devices may be valves configured to seal against the galley carts 108 for direct airflow therebetween.

During use, when utilizing the chiller galley cart to supply cooled airflow for the demand galley carts, flow of air through the supply and return system 118 flows from the chiller galley cart through the chiller supply port 176 into the air supply duct 132 and then through the demand supply port 177 into the demand galley cart (for an air-through cooling arrangement) or into the cart compartment 102 (for an air-over cooling arrangement). The cooled air is used to cool the demand galley carts before being returned to the chiller galley cart. The air flows through the demand return ports 179 into the air return duct 134 and then through the chiller return port 178 to the chiller galley cart. Other arrangements and devices are possible in alternative embodiments.

In an exemplary embodiment, both the air supply duct 132 and the air return duct 134 are routed along the rear wall 166 of the galley 104. In the illustrated embodiment, the chiller supply and return ports 176, 178 are approximately centered within the cart compartment 102 between the side walls 168, 170 such that the chiller galley cart(s) may be centered in the cart compartment 102; however, other arrangements are possible in alternative embodiments. For example, multiple positions of the chiller supply and return ports 176, 178 may be provided.

The galley cart 108 illustrated in FIG. 2 is a demand galley cart and may be identified hereinafter as a demand galley cart 180. The demand galley cart 180 includes a plurality of walls 182 defining an interior cavity 184 configured to receive items, such as catering items for a flight. The demand galley cart 180 may receive trays holding food or drink items in the interior cavity. The walls 182 include a top wall 185, a bottom wall 186, a rear wall 187, a front wall (opposite the rear wall 187), and side walls 189, 190. The demand galley cart 180 includes wheels 192 at the bottom thereof for transporting the demand galley cart 180. The demand galley cart 180 may include doors 194 at the front wall and/or the rear wall 187 for accessing the trays in the interior cavity 184.

In an exemplary embodiment, the demand galley cart 180 includes a demand supply valve 196 and a demand return valve 198 defined in one of the walls 182, such as in the rear wall 187. In the illustrated embodiment, both the demand supply valve 196 and the demand return valve 198 are provided on the same wall; however, the demand supply valve 196 and the demand return valve 198 may be provided on different walls in alternative embodiments. The demand supply valve 196 is configured to be in flow communication with the demand supply port 177 and the supply duct 132. For example, the demand supply valve 196 may be directly coupled to the demand supply port 177. A sealed connection may be made between the demand supply valve 196 and the demand supply port 177, such as by a gasket or other type of seal. The demand return valve 198 is configured to be in flow communication with the demand return port 179 and the return duct 134. For example, the demand return valve 198 may be directly coupled to the demand return port 179. A sealed connection may be made between the demand return valve 198 and the demand return port 179, such as by a gasket or other type of seal.

FIG. 3 is a front view of one of the galley carts 108, namely a chiller galley cart 200 that holds a point-of-use chiller 201 (shown in phantom). FIG. 4 is a side view of the chiller galley cart 200 and the chiller 201 (shown in phantom). FIG. 5 is a rear view of the chiller galley cart 200 and the chiller 201 (shown in phantom). The chiller galley cart 200 includes a plurality of walls 202 defining an interior cavity 204 configured to house the chiller 201. The chiller 201 is used to generate cooling airflow for cooling the demand galley carts (shown in FIG. 2). The chiller 201 includes a heat exchange unit 203, such as a refrigeration unit, used to provide the cooling airflow. For example, the heat exchange unit may include an evaporator, a condenser, a compressor, and an expansion valve (not shown). The chiller 201 may include circulators for circulating air through the system and refrigerant through the system used to cool the air. The chiller 201 may include ducting for controlling airflow through the chiller 201.

The walls 202 include a top wall 205, a bottom wall 206, a rear wall 207, a front wall 208, and side walls 209, 210. The chiller galley cart 200 includes wheels 212 at the bottom thereof for transporting the chiller galley cart 200. The chiller galley cart 200 may include doors 214 at the front wall 208 and/or the rear wall 207 for accessing the interior cavity 204, such as for control or maintenance of the chiller 201, for emptying a drip tray 215 at a bottom of the interior cavity 204 below the chiller 201 that collects the condensate from the chiller 201, or for other purposes.

In an exemplary embodiment, the chiller galley cart 200 includes a chiller supply valve 216 (FIG. 5) and a chiller return valve 218 (FIG. 5) defined in one of the walls 202, such as in the rear wall 207. In the illustrated embodiment, both the chiller supply valve 216 and the chiller return valve 218 are provided on the same wall; however, the chiller supply valve 216 and the chiller return valve 218 may be provided on different walls in alternative embodiments. The chiller supply valve 216 is configured to be in flow communication with the chiller supply port 176 and the supply duct 132 (both shown in FIG. 2). For example, the chiller supply valve 216 may be directly coupled to the chiller supply port 176. A sealed connection may be made between the chiller supply valve 216 and the chiller supply port 176, such as by a gasket or other type of seal. The chiller return valve 218 is configured to be in flow communication with the chiller return port 178 and the return duct 134 (both shown in FIG. 2). For example, the chiller return valve 218 may be directly coupled to the chiller return port 178. A sealed connection may be made between the chiller return valve 218 and the chiller return port 178, such as by a gasket or other type of seal.

In an exemplary embodiment, the chiller galley cart 200 includes an inlet 220 and an outlet 222 defined in one of the walls 202, such as the front wall 208. In the illustrated embodiment, both the inlet 220 and the outlet 222 are provided on the same wall; however, the inlet 220 and the outlet 222 may be provided on different walls in alternative embodiments. The inlet 220 and the outlet 222 are configured to couple to the chiller 201 in the interior cavity 204. The inlet 220 and the outlet 222 circulate airflow through the chiller galley cart 200 for cooling the condenser of the heat exchanger of the chiller 201. The chiller 201 provides warmed exhaust air through the outlet 222. The exhaust air may be exhausted into the galley area 115 outside of the cart compartment 102 or may be exhausted to another area of the aircraft, such as below the cabin floor.

In an exemplary embodiment, the chiller galley cart 200 includes an electrical adapter 224 defined at one wall 202, such as the rear wall 207. The electrical adapter 224 is configured to couple to or is part of the chiller 201 to provide power to the chiller 201. The electrical adapter 224 is configured to couple to an electrical connector 226 (shown in FIG. 2) of the galley 104. For example, when the chiller galley cart 200 is loaded into the cart compartment 102, the electrical adapter 224 is plugged to the electrical connector 226 to make an electrical connection therebetween. The electrical adapter 224 and/or the electrical connector 226 may be provided at an end of a power cord.

Figures 6, 7, 8:
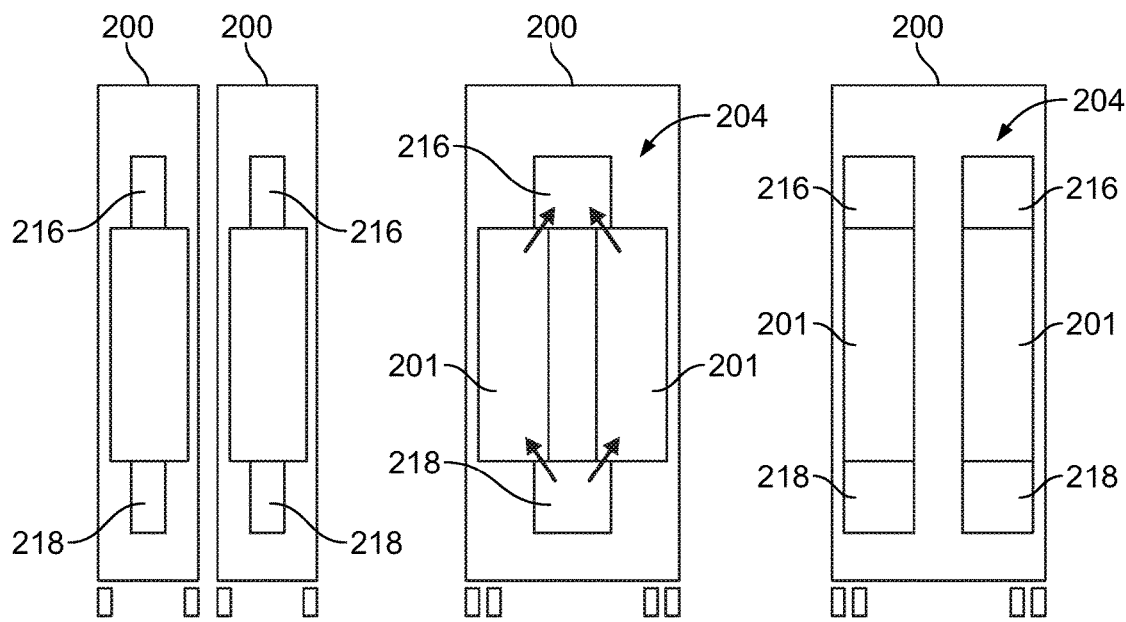
FIG. 6 illustrates two of the chiller galley carts arranged side-by-side.
FIG. 7 illustrates the chiller galley cart having two chillers arranged in an interior cavity thereof.
FIG. 8 illustrates the chiller galley cart having two chillers arranged in the interior cavity.

FIG. 6 illustrates two of the chiller galley carts 200 arranged side-by-side. In an exemplary embodiment, the chiller galley carts 200 are narrower than standard galley carts, such as the demand galley carts 180 (shown in FIG. 2). For example, the standard galley cart may have dimensions of approximately 100.0 cm tall, 80.0 cm deep (front-to-rear) and 30.0 cm wide (side-to-side). The chiller galley cart 200 may be a half-width cart having a width that is approximately half of a width of a standard galley cart, such as the demand galley cart. For example, the chiller galley cart 200 may be approximately 15.0 cm wide, or less. As such, two chiller galley carts 200 may be stacked side-by-side within the space in the galley dedicated to receive one of the demand galley carts 180. The galley 104 does not need to be re-dimensioned to accommodate the chiller galley carts 200. One, two, or none of the chiller galley carts 200 may be used in the galley 104. The airflow supply and return system 118 accommodates the arrangement of the chiller galley carts 200, such as providing connections for both chiller galley carts 200. For example, each chiller galley cart 200 includes one of the chiller supply valves 216 and one of the chiller return valves 218, which may be coupled to the same ducts 132, 134 (shown in FIG. 2) or to separate ducts 132, 134.

FIG. 7 illustrates the chiller galley cart 200 having two chillers 201 arranged in the interior cavity 204. The chiller galley cart 200 may have dimensions similar to standard galley carts such that the chiller galley cart 200 may be used in the cart compartment 102 in place of a demand galley cart, when desired. Both chillers 201 are in flow communication with the same chiller supply valve 216 and the chiller return valve 218. Such an arrangement may boost or increase the amount of cooling airflow that may be provided to the airflow supply and return system 118 from the chiller galley cart 200 as compared to a chiller galley cart 200 having a single chiller 201. One, both, or none of the chillers 201 may be operated at a given time to control the amount of cooling airflow supplied to the airflow supply and return system 118.

FIG. 8 illustrates the chiller galley cart 200 having two chillers 201 arranged in the interior cavity 204. Each chiller 201 is in flow communication with a corresponding chiller supply valve 216 and a corresponding chiller return valve 218. As such, the chiller galley cart 200 includes two chiller supply valves 216 and two chiller return valves 218. Such an arrangement defines two different cooling circuits for the galley 104, each able to cool different demand galley carts 180.

Figure 9:
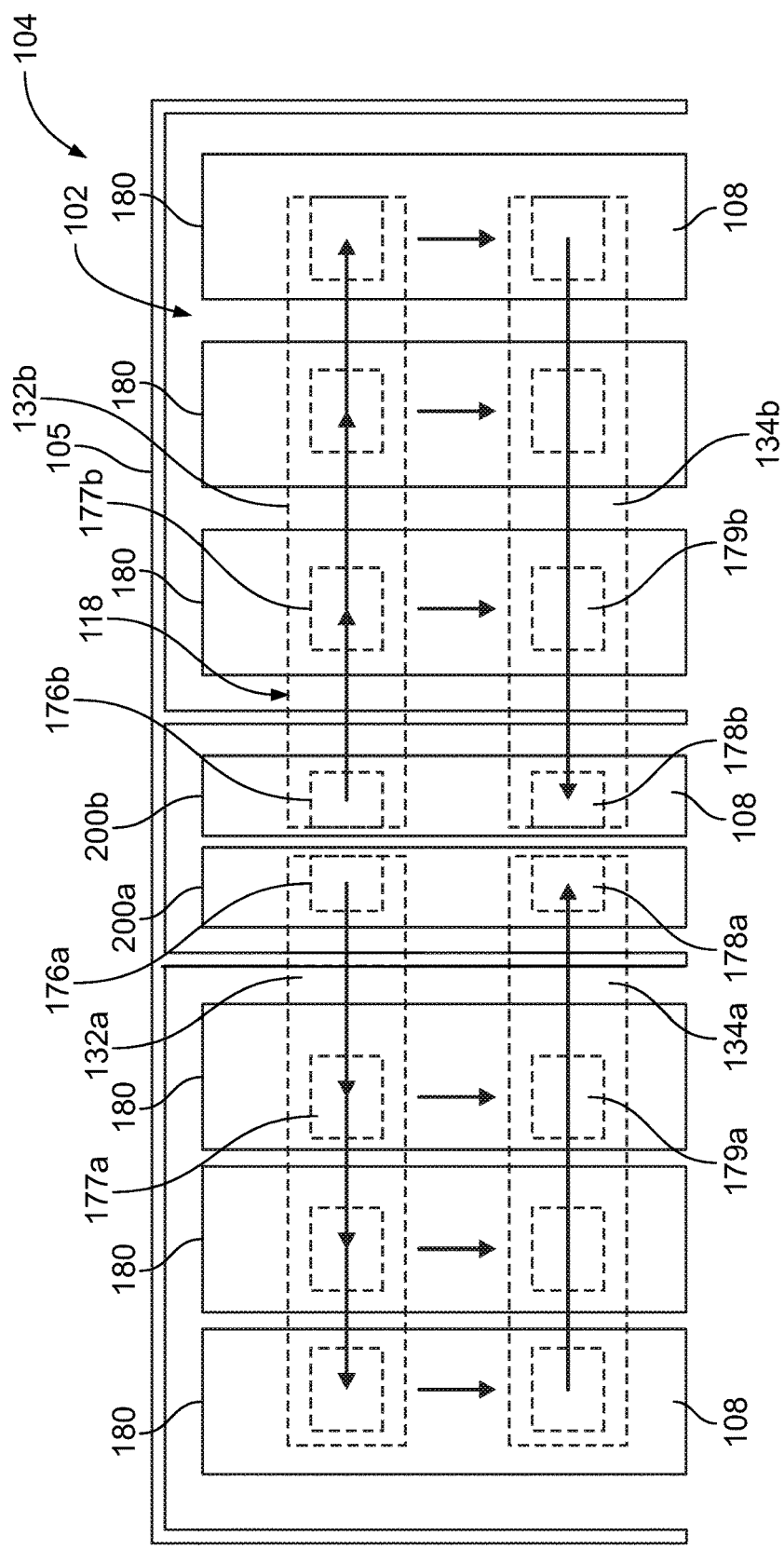
FIG. 9 is a schematic illustration of a portion of the galley showing the cart compartment.

FIG. 9 is a schematic illustration of a portion of the galley 104 showing the cart compartment 102 below the mid-wall 105. FIG. 9 illustrates a pair of the chiller galley carts 200 in the center of the cart compartment 102, flanked by banks of demand cart compartments 180. In the illustrated embodiment, the cart compartment is a seven-bay galley configured to receive seven galley carts 108. While it is possible to provide seven demand galley carts 180 in the cart compartment 102, the illustrated arrangement replaces the center demand galley cart with a pair of half-width chiller galley carts 200. Optionally, a full-width chiller galley cart, such as those shown in FIG. 7 or 8 may be used rather than the half-width chiller galley carts 200.

The airflow supply and return system 118 is shown as a two-circuit system having two separate and discrete circuits, each associated with one of the half-width chiller galley carts 200. However, other embodiments may provide a single circuit, which may be coupled to both of the half-width chiller galley carts 200. In other various embodiments, the airflow supply and return system 118 may be coupled to an above galley heat exchanger, such as the heat exchanger 116 shown in FIG. 1, in addition to the chiller galley carts 200.

The airflow supply and return system 118 includes a first supply duct 132a and a first return duct 134a forming part of the first circuit and a second supply duct 132b and a second return duct 134b forming part of the second circuit. The airflow supply and return system 118 includes a first chiller supply port 176a and a first chiller return port 178a forming part of the first circuit and a second chiller supply port 176b and a second chiller return port 178b forming part of the second circuit. The airflow supply and return system 118 includes first demand supply ports 177a and first demand return ports 179a forming part of the first circuit and second demand supply ports 177b and second demand return ports 179b forming part of the second circuit. The first chiller galley cart 200a provides cooling airflow to the first supply duct 132a and corresponding demand galley carts 180. The second chiller galley cart 200b provides cooling airflow to the second supply duct 132b and corresponding demand galley carts 180.

FIG. 10 is a schematic illustration of a portion of the galley 104 showing the cart compartment 102 below the mid-wall 105. FIG. 10 illustrates the second chiller galley cart 200 coupled to the second circuit for cooling the corresponding demand galley carts 180. FIG. 10 illustrates a half-width galley cart 250 adjacent the half-width chiller galley cart 200b. The half-width galley cart 250 replaces the first chiller galley cart 200a (shown in FIG. 9). Having the chiller galley cart 200 on wheels allows easy insertion and removal between flights, such as by a caterer. The half-width galley cart 250 does not include a chiller, but rather may hold other items, such as food, beverages or other items needed at the galley by the crew. The half-width galley cart 250 may include a garbage can or garbage bag for collecting garbage. None of the demand galley carts 180 on the left side receive cooling. Such an arrangement may be used on flights having less demand for cooling of the galley carts, such as for shorter range or mid-range flights.

FIG. 11 is a schematic illustration of a portion of the galley 104 showing the cart compartment 102 below the mid-wall 105. FIG. 11 illustrates one of the demand galley carts 180 in the chiller cart area of the cart compartment. The demand galley cart 180 replaces the chiller galley carts 200 (shown in FIG. 9). The demand galley cart 180 does not include a chiller. None of the demand galley carts 180 on the left side or the right side receive any cooling from chiller galley carts 200 (however, the airflow supply and return system 118 may be coupled to the heat exchanger 116 (shown in FIG. 1) to receive cooling airflow). Such an arrangement may be used on flights having less demand for cooling of the galley carts, such as for shorter range flights.

FIG. 12 is a schematic illustration of a portion of a side-wall galley 104a configured to be arranged along a side-wall of an aircraft. FIG. 13 is an end view of the side-wall galley 104a showing the cart compartment 102 relative to a side-wall 260 of the aircraft. The front of the side-wall galley 104 extends parallel to the length of the aircraft. The rear of the side-wall galley 104 faces the side-wall 260. Due to the limited height above the side-wall galley 104a, the use of a top heat exchange, such as the heat exchanger 116 (shown in FIG. 1) may not be possible. Some conventional galley systems incorporate a heat exchanger into the cabinet space, which may occupy 25% or more of the cabinet space, which greatly affects the stowage capacity of the side-wall galley 104a.

In an exemplary embodiment, the side-wall galley 104a accommodates one of the half-width chiller galley carts 200 and one of the half-width galley carts 250, as well as two of the demand galley carts 180; however, other combinations of galley carts are possible in alternative embodiments. The supply duct 132 and the return duct 134 are coupled between the chiller galley cart 200 and the demand galley carts 180. The half-width chiller galley cart 200 and the half-width galley carts 250 may be removed on some flights to accommodate a third standard or demand galley carts 180 depending on the need for cooling items for the particular flight. Having the chiller galley cart 200 on wheels allows easy insertion and removal between flights, such as by a caterer.

FIG. 14 is a schematic illustration of a portion of the side-wall galley 104a showing the side-wall galley 104a lengthened to accommodate three full size demand galley carts 180 and one of the chiller galley carts 200. The half-width chiller galley cart 200 may be removed and replaced with one of the half-width galley carts 250 (shown in FIG. 12) on some flights to accommodate more stowage. Having the chiller galley cart 200 on wheels allows easy insertion and removal between flights, such as by a caterer.

A galley system is provided for an aircraft that uses point-of-use chiller galley carts to supply cooling air to other galley carts. The chiller galley carts eliminate the need for overhead heat exchangers or boost such overhead heat exchangers. In some embodiments, when eliminating the overhead heat exchangers, the weight of the galley system is reduced. The space needed for the heat exchanger components and at least some of the ducting is removed to create more room for stowage in the galley or more room in the passenger compartment. The chiller galley carts are portable and configured for insertion and removal from the cart compartment for meeting flexible cooling demands. For example, on shorter flights, less cooling is needed because less drinks and food are need for the flight. As such, the chiller galley carts are able to be removed from the cart compartment to provide more stowage space. However, on longer flights, more cooling is needed for the additional food and drinks. The chiller galley carts are able to be loaded into the cart compartment to provide cooling for the other demand galley carts.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A chiller galley cart comprising:
   a plurality of walls defining an interior cavity;
   a chiller positioned in the interior cavity, the chiller including a heat exchange unit and an air circulator to provide cooled airflow from the chiller galley cart, the heat exchange unit positioned in the interior cavity, the air circulator positioned in the interior cavity;
   a supply valve defined in one wall of the plurality of walls in flow communication with the chiller;
   a return valve defined in one wall of the plurality of walls in flow communication with, wherein the heat exchange unit of the chiller comprises an evaporator, a compressor, a condenser and an expansion valve positioned in the interior cavity and is coupled in flow communication to the supply valve and the return valve to provide the cooled airflow from the chiller galley cart.

2. The galley cart of claim 1, wherein the supply valve is configured to supply the cooled airflow generated by the chiller inside the interior cavity to an exterior of the chiller galley cart.

3. The galley cart of claim 1, wherein the walls completely enclose the chiller therein.

4. The galley cart of claim 1, further comprising an inlet defined in one of the plurality of walls and an outlet defined in one of the plurality of walls, wherein the inlet and the outlet are configured to couple to the chiller positioned in the interior cavity such that the chiller provides warmed exhaust air through the outlet.

5. The galley cart of claim 1, further comprising an electrical adapter defined at one wall of the plurality of walls, the electrical adapter configured to couple to the chiller in the interior cavity and to an electrical connector of a galley.

6. The galley cart of claim 1, further comprising a second chiller positioned in the interior cavity, the second chiller including a second heat exchange unit to provide cooled airflow from the chiller galley cart, the second heat exchange unit positioned in the interior cavity.

7. The galley cart of claim 6, wherein the second chiller is coupled to the supply valve and the return valve to provide cooled airflow from the chiller galley cart.

8. The galley cart of claim 6, further comprising a second supply valve defined at one of the plurality of walls and a second return valve defined in one of the plurality of walls, wherein the second supply valve and the second return valve are configured to couple to the second chiller positioned in the interior cavity to provide cooled airflow from the chiller galley cart.

9. The galley cart of claim 1, wherein the chiller galley cart has a width less than half a width of a standard galley cart such that the chiller galley cart is configured to be stacked with a second chiller galley cart in a galley cart compartment space sized for a standard galley cart.

10. The galley cart of claim 1, wherein the plurality of walls comprises a front wall, a rear wall and side walls extending between the front wall and the rear wall, the supply valve in the return valve being defined in the rear wall.

11. The galley cart of claim 1, further comprising a drip tray in a bottom of the interior cavity to collect condensate from the chiller.

12. The galley cart of claim 1, further comprising wheels at a bottom of the chiller galley cart to facilitate moving the chiller galley cart with the chiller into and out of a galley.

13. A galley comprising:
   a cart compartment configured to store a plurality of galley carts including a chiller galley cart and at least one demand galley cart, the chiller galley cart including a plurality of walls defining an interior cavity and a chiller positioned in the interior cavity, the chiller including a heat exchange unit and an air circulator to provide cooled airflow from the chiller galley cart, the chiller galley cart including a supply valve in flow communication with the chiller and a return valve in flow communication with the chiller, wherein the heat exchange unit of the chiller comprises an evaporator, a compressor, a condenser and an expansion valve positioned in the interior cavity and is coupled in flow communication to the supply valve and the return valve to provide the cooled airflow from the chiller galley cart;
   a supply duct configured to be in flow communication with the plurality of galley carts;
   a return duct configured to be in flow communication with the plurality of galley carts;
   a chiller supply port in flow communication with the supply duct, the chiller supply port coupled to the supply valve of the chiller galley cart of the plurality of galley carts to channel cooled air from the chiller positioned in the chiller galley cart into the supply duct; and a chiller return port in flow communication with the return duct, the chiller return port coupled to the return valve of the chiller galley cart to channel return air from the return duct into the chiller positioned in the chiller galley cart.

14. The galley of claim 13, wherein the supply duct only receives cooled airflow from the chiller galley cart received in the cart compartment.

15. The galley of claim 13, further comprising an electrical connector positioned proximate to the chiller supply port and the chiller return port, the electrical connector configured to couple to an electrical adapter of the chiller galley cart.

16. The galley of claim 13, wherein the supply duct and the return duct channel airflow between the chiller galley cart and the at least one demand galley cart of the plurality of galley carts.

17. The galley of claim 13, wherein the supply duct is open to the cart compartment to channel the cooled air from the chiller galley cart into the cart compartment for air over cooling of at least one demand galley cart of the plurality of galley carts.

18. The galley of claim 13, further comprising a demand supply port in flow communication with the supply duct, the demand supply port configured to couple to a supply valve of the demand galley cart of the plurality of galley carts to channel the cooled air from the supply duct to the demand galley cart for air through cooling of the demand galley cart.

19. The galley of claim 13, wherein the supply duct defines a first supply duct and the return duct defines a first return duct, the chiller supply port defines a first chiller supply port and the chiller return port defines a first chiller return port, the galley further comprising:

a second supply duct separate from the first supply duct and configured to be in flow communication with corresponding galley carts of the plurality of galley carts;

a second return duct separate from the first return duct and configured to be in flow communication with corresponding galley carts of the plurality of galley carts;

a second chiller supply port in flow communication with the second supply duct, the second chiller supply port configured to couple to a supply valve of a second chiller galley cart of the plurality of galley carts to channel cooled air from a chiller positioned in the second chiller galley cart into the second supply duct; and a second chiller return port in flow communication with the second return duct, the second chiller return port configured to couple to a return valve of the second chiller galley cart to channel return air from the return duct into the chiller positioned in the second chiller galley cart.

20. The galley of claim 13, wherein the supply duct is configured to be in flow communication with a stowage compartment above the cart compartment.

21. A method for cooling at least one demand galley cart positioned in a cart compartment of a galley, the galley including a supply duct, a return duct, a supply port in flow communication with the supply duct, and a return port in flow communication with the return duct, the method comprising:

positioning a chiller galley cart in the cart compartment, the chiller galley cart including a plurality of walls defining an interior cavity, a supply valve defined in one wall of the plurality of walls, a return valve defined in one wall of the plurality of walls, and a chiller positioned in the interior cavity, the chiller including a heat exchange unit and an air circulator to provide cooled airflow from the chiller galley cart, the chiller being coupled to the supply valve and the return valve, wherein the heat exchange unit of the chiller comprises an evaporator, a compressor, a condenser and an expansion valve positioned in the interior cavity and is coupled in flow communication to the supply valve and the return valve to provide the cooled airflow from the chiller galley cart;

coupling the supply valve of the chiller galley cart to the supply port to provide cooled airflow from the chiller to the supply duct; and coupling the return valve of the chiller galley cart to the return port to provide return air from the return duct to the chiller.

* * * * *